US008683047B2

(12) United States Patent
Han et al.

(10) Patent No.: US 8,683,047 B2
(45) Date of Patent: Mar. 25, 2014

(54) METHOD AND APPARATUS FOR DYNAMICALLY DETERMINING CONNECTION ESTABLISHMENT MECHANISM BASED ON THE RELATIVE LOCATIONS

(75) Inventors: Zhu Han, Beijing (CN); Zhiyong Liang, Beijing (CN); Ling Shao, Beijing (CN); Kai Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 990 days.

(21) Appl. No.: 12/499,820

(22) Filed: Jul. 9, 2009

(65) Prior Publication Data

US 2010/0017519 A1    Jan. 21, 2010

(30) Foreign Application Priority Data

Jul. 15, 2008   (CN) .......................... 2008 1 0133904

(51) Int. Cl.
*G06F 15/16*   (2006.01)
(52) U.S. Cl.
USPC ........................................................ 709/227
(58) Field of Classification Search
USPC ........................................................ 709/227
See application file for complete search history.

(56) References Cited

U.S. PATENT DOCUMENTS

| | | | | |
|---|---|---|---|---|
| 5,862,335 A * | 1/1999 | Welch et al. | .................. | 709/224 |
| 5,948,069 A * | 9/1999 | Kitai et al. | .................... | 709/240 |
| 5,958,053 A * | 9/1999 | Denker | ............................ | 726/1 |
| 6,182,139 B1 * | 1/2001 | Brendel | ........................ | 709/226 |
| 7,346,909 B1 | 3/2008 | Eldar | | |
| 7,620,955 B1 * | 11/2009 | Nelson | .......................... | 719/312 |
| 7,672,239 B1 * | 3/2010 | Tripathi et al. | ............... | 370/235 |
| 2004/0034773 A1 * | 2/2004 | Balabine et al. | ............. | 713/168 |
| 2004/0199576 A1 * | 10/2004 | Tan | ................ | 709/203 |
| 2005/0114855 A1 * | 5/2005 | Baumberger | ..................... | 718/1 |
| 2006/0280124 A1 * | 12/2006 | Denton et al. | ................ | 370/250 |
| 2007/0101323 A1 * | 5/2007 | Foley et al. | ........................ | 718/1 |
| 2007/0253436 A1 | 11/2007 | Henry et al. | | |
| 2008/0240122 A1 * | 10/2008 | Richardson et al. | .......... | 370/401 |
| 2008/0285552 A1 * | 11/2008 | Abdulla et al. | ............... | 370/389 |

FOREIGN PATENT DOCUMENTS

WO    2007126835 A2    8/2007

OTHER PUBLICATIONS

Wei Huang, et al., "Virtual Machine Aware Communication Libraries for High Performance Computing", Network-Based Computing Laboratory, The Ohio State University, Nov. 2007.

* cited by examiner

*Primary Examiner* — Christopher Biagini
(74) *Attorney, Agent, or Firm* — Scully, Scott, Murphy & Presser, P.C.; Preston J. Young, Esq.

(57) ABSTRACT

An apparatus and a method for dynamically determining a connection establishment mechanism between virtual machines (VMs) based on locations of the VMs. The apparatus includes a communication agent unit for receiving messages relating to the locations of the VMs, a control unit for determining the connection establishment mechanism between the VMs based on the received messages and a controlling mechanism to establish a connection between the VMs according to the determined connection establishment mechanism. The method includes receiving messages relating to the locations of the VMs, determining the connection establishment mechanism between the VMs based on the received messages, and establishing a connection between the VMs according to the determined connection establishment mechanism.

17 Claims, 10 Drawing Sheets

| Message type | VM1 ID | VM1 IP address | VM1 port number | VM2 ID | VM2 IP address | VM2 port number | ..... |
|---|---|---|---|---|---|---|---|

Message type: 0000- registration request  
0001- connection establishment request } from VM to virtualization layer 0010-on the same physical host  
0011-on different physical hosts } from virtualization layer to VM

METHOD AND APPARATUS FOR DYNAMICALLY DETERMINING CONNECTION ESTABLISHMENT MECHANISM BASED ON THE RELATIVE LOCATIONS

CROSS REFERENCE TO RELATED APPLICATION

This application claims priority under 35 U.S.C. 119 from Chinese Patent Application 200810133904.6 filed Jul. 15, 2008, the entire contents of which are incorporated herein by reference.

BACKGROUND OF THE INVENTION

1. Field of the Invention

The present invention relates to server virtualization. More particularly, the present invention relates to a method and apparatus for dynamically determining connection establishment mechanisms between virtual machines (VMs) in a virtual environment based on the relative locations thereof.

2. Description of Related Art

Due to the low usage of server resources and the resultant necessity of server consolidation, and the increasing performance improvement of individual servers after the emergence of multi-core processors, server virtualization techniques are attracting more and more attention of venders. Through allocating various physical resources among multiple VMs, server virtualization can run different applications, or even different Operating Systems (OSs), on single enterprise server simultaneously. Each VM, appearing as a stand alone server, runs in the same physical server in fact. Executing multiple applications on a single server can improve the usage of the server while reducing the number of servers to be managed and maintained. As application requirements increase, it is convenient to create additional VMs rapidly in response to the varying requirements without the trouble of deploying other physical machines.

Recently, server virtualization has become a hot topic in system research and solution area. One aspect of server virtualization is to virtualize a number of distributed physical servers (hereinafter called "physical hosts") into a large logical server. Further, with server virtualization techniques, it is possible for IT administrators to move a running VM among physical machines while keeping the VM continuously available. One important feature of server virtualization is live migration, which means the migration of a VM from one physical host to another one under "power-on" condition. Live migration can reduce the down time to an unperceivable level, such as several milliseconds, and therefore have no significant affect on end users, enabling the administrator to carry out various tasks on physical servers, such as offline maintenance, update, configuration, load balance and management.

FIG. 1 schematically shows a VM that is migrated from one physical host, physical host 1, to another one, physical host 2, in a virtual environment including a number of physical servers connected together via a Local Area Network (LAN). FIG. 1 is merely an illustrative example, and those skilled in the art can understand the number of the physical servers in the LAN and the number of VMs deployed on each physical server can be adjusted according to specific requirement.

Generally, some applications on a VM need to communicate with certain applications on other VMs by high performance private channel, e.g., Intrusion Detection System (IDS) and firewall applications, firewall and Virtual Private Network (VPN) applications. In a common situation, several VMs are connected with each other by Ethernet and the inter-communication traffic between the different applications must go through a TCP/IP stack. When different applications are consolidated together to one physical host, there is an opportunity to optimize the performance of the private channel. Specifically, the private channel can be built without checksum, in order delivery, congestion control and payload encapsulation of the Transmission Control Protocol/Internet Protocol (TCP/IP) stack because all of the traffic is moved just in the Random Access Memory (RAM). Thus, the performance of the private channel can be boosted a lot with a thin protocol layer (hereinafter, called "light weight protocol") which omits the large part of overhead leaded by the TCP/IP stack. Herein, light weight protocol is a general term of a kind of method for communication on a same physical host with less system overhead and/or the implementations thereof.

FIG. 2 is a schematic diagram of a system in the prior art, in which two VMs communicate with each other through a TCP/IP stack. In FIG. 2, no matter whether the VMs are on the same physical host, in order to transmit messages between them, a connection must be established between the VMs by using the well known TCP/IP protocol in the art. A main advantage of the method for establishing a channel between VMs by TCP/IP protocol is the best flexibility achieved. Even if a VM migration occurs after the connection establishment, the connection between two VMs is not interrupted. In addition, as a popular protocol adopted in the existing computer networks, it is not necessary to make any modification to the TCP/IP protocol stack for VMs, therefore, a great compatibility with other existing applications can be obtained. On the other hand, the method for establishing a channel between VMs by TCP/IP protocol has the following drawback: when the VMs are on the same physical host, using TCP/IP protocol may bring about unnecessary system overhead, because all traffic occur between different VMs are merely in the RAM, so that the checksum protection, in order delivery, congestion control and payload encapsulation provided for in the TCP/IP protocol are useless in nature.

FIG. 3 schematically shows a system in the prior art, in which two VMs on the same physical host communicate with each other through a light weight protocol, such as shared memory or other light weight protocols implemented by firmware. Using a light weight protocol to establish a channel between two VMs has the advantage of the best system performance, that is, lower system overhead, faster processing speed and fewer physical resources occupied. However, it has a shortcoming of the lack of connection flexibility, because the connection established by light weight protocol between two VMs will interrupt when a migration occurs to any one of VMs, which arising from the intrinsic characters of the light weight protocols.

For example, the paper by Wei Huang, et al, Proceedings of the 2007 ACM/IEEE Conference on Supercomputing, Nov. 10-16, 2007, titled "Virtual Machine Aware Communication Libraries for High Performance Computing" discloses how to establish efficient communications when two VMs are on the same physical host. Particularly, a virtual machine aware communication library is purposed to support the high efficient shared memory communication between computing processings on the same physical host. The paper does not address the problem of how to handle VM migrations that occur after the connection establishment, and therefore, it does not overcome the shortcoming of the existing light weight protocols.

It is highly desirable to provide a method, apparatus and system for dynamically determining the connection establishment mechanism between VMs based on the locations thereof.

SUMMARY OF THE INVENTION

In accordance with one aspect, the present invention provides an apparatus for dynamically establishing a connection between virtual machines (VMs) based on locations of the VMs. The apparatus includes: a communication agent unit for receiving messages relating to the locations of the VMs; and a control unit for (i) determining a connection establishment mechanism between the VMs based on the received messages, and (ii) controlling the establishment of a connection between the VMs based upon the determined connection establishment mechanism, whereby the connection is dynamically established.

In accordance with another aspect, the present invention provides a method of dynamically establishing a connection between VMs based on locations of the VMs. The method includes the steps of: receiving messages relating to the locations of the VMs; determining a connection establishment mechanism between the VMs based on the received messages; and establishing a connection between the VMs according to the determined connection establishment mechanism, whereby the connection is dynamically established

BRIEF DESCRIPTION OF THE DRAWINGS

The present invention will be understood more easily from the following description taken in conjunction with the drawings, wherein similar components are indicated by similar labels.

FIG. 7 is a schematic diagram showing the form of message exchanged between a VM and a virtualization layer.

DETAILED DESCRIPTION OF THE PREFERRED EMBODIMENTS

The principle idea of the present invention, when establishing a connection between two VMs, is: detecting the locations of the VMs and, if the two VMs are on the same physical host, adopting light weight protocol to establish the connection or, if the two VMs are on different physical hosts, adopting TCP/IP protocol to establish the connection.

When one of two VMs on the same physical host is migrated to a different physical host after the establishment of connection between them via light weight protocol, the connection establishment mechanism being used is switched to TCP/IP protocol from light weight protocol seamlessly, while sustaining the original connection.

In the case of a connection having been established between two VMs on different physical hosts via TCP/IP protocol, when one of them is migrated to the physical host on which the other VM locates, the connection establishment mechanism being used is switched to light weight protocol from TCP/IP protocol seamlessly, while sustaining the original connection. The term "seamlessly" used herein means the change of the underlayer communication mechanism is transparent to the higher level applications.

Since the switch process is unperceivable to the higher level applications, the present invention can overcome the shortcomings of unnecessary system overhead occurred in VM communication and non-sustainable connection between VMs after VM migration. Therefore, the best system performance and greatest compatibility with existing techniques can be obtained, while the cost of users can be reduced.

Figure 1:
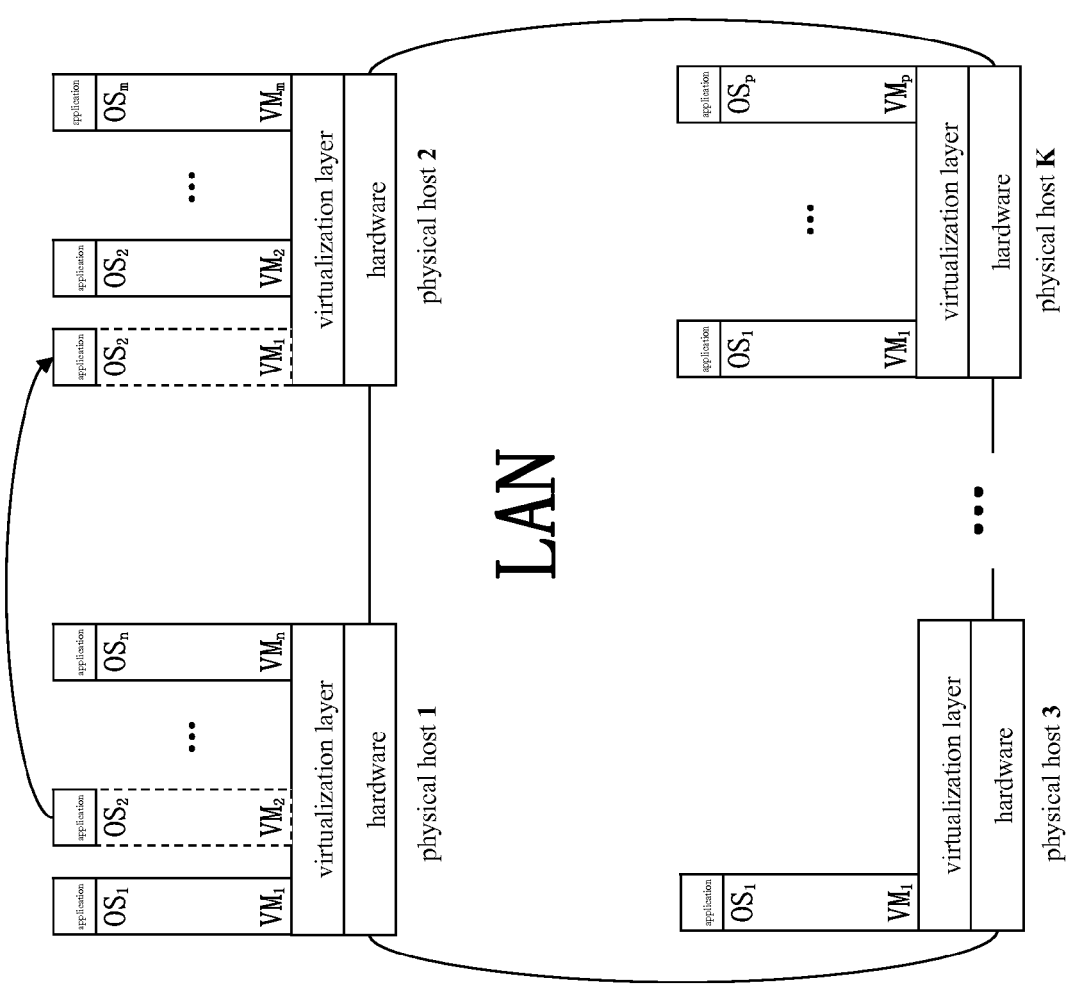
FIG. 1 shows the migration of a VM from one physical host to another in a virtual environment with multiple physical hosts connected together over a LAN in accordance with the prior art.
Figure 2:
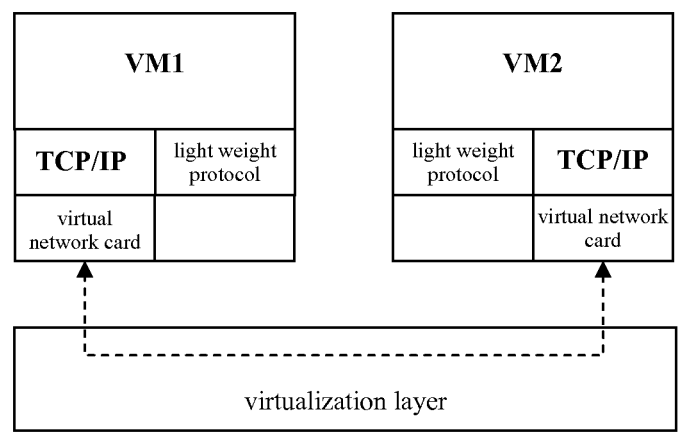
FIG. 2 is a schematic diagram showing a system in the prior of art, in which two VMs communicate with each other by TCP/IP protocol.
Figure 3:
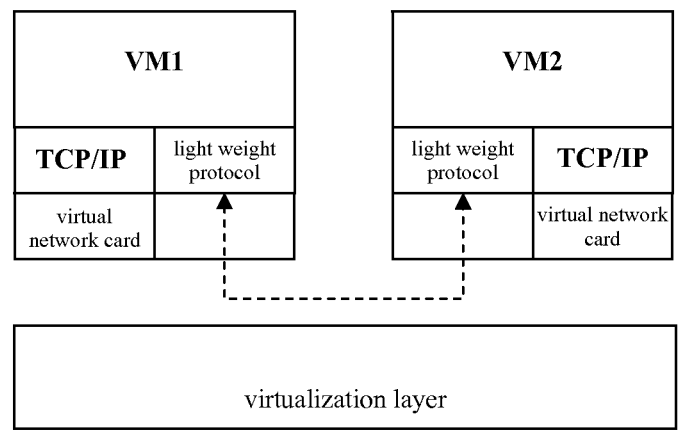
FIG. 3 schematically shows a system in the prior of art, in which two VMs on the same physical host communicate with each other by a light weight protocol.
Figure 4:
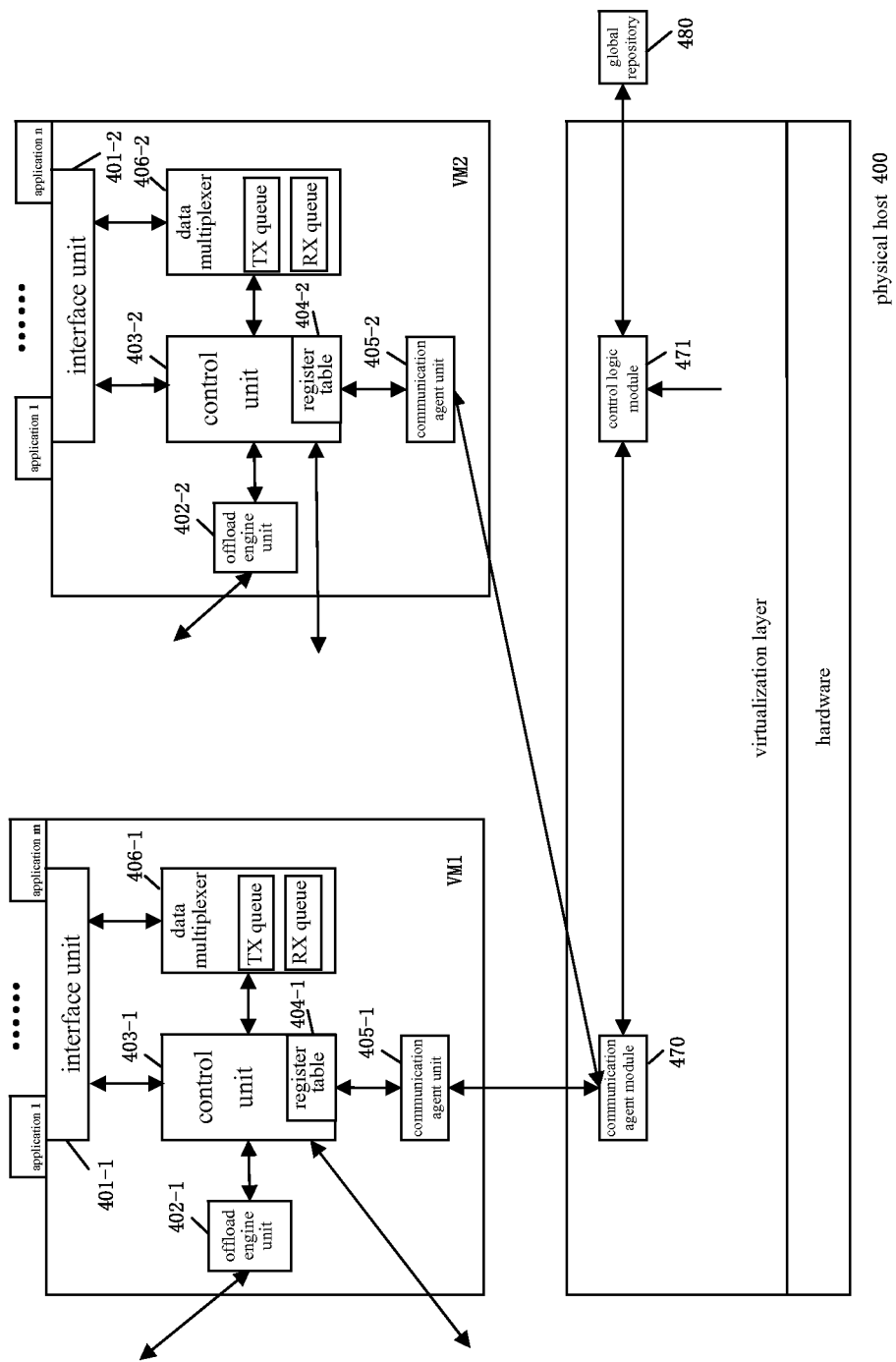
FIG. 4 schematically shows the block diagram of a virtual system of the present invention for dynamically determining the connection establishment mechanism between VMs according to the locations thereof.

Referring to FIG. 4, a block diagram shows the virtual system of the present invention for dynamically determining the connection establishment mechanism between VMs according to the locations thereof. Although only one physical host is illustrated in the virtual system shown in FIG. 4, those skilled in the art will understand there can be two or more physical hosts with the same configuration in that virtual system. Although FIG. 4 shows two VMs on a physical host, those skilled in the art will understand there can be more VMs on the physical host.

As shown in FIG. 4, the virtual system includes a physical host 400 and a global repository 480. Physical host 400 can be a host machine commercially available from, for example, Sun Corporation, IBM Corporation or Dell Corporation. Global repository 480 in the virtual system is used to store information about the VMs on each physical host within the virtual system as described in detail below.

Global repository 480 can be implemented as database, file, or binary information stored on a physical host or over a LAN in a distributed manner, or it can be in the form of any other data structure capable of storing information about VMs.

Physical host 400, from its lowest level to the highest level, includes hardware, a virtualization layer, VMs and a number of applications. The hardware, supplied by various manufactures, is the basis for realizing various functions of the host machine.

The virtualization layer includes communication agent module 470 and control logic module 471. Communication agent module 470 is used by the virtualization layer to communicate with each VM thereon, and its specific implementation can be found in the prior art, for example, in XEN adopting paravirtualization technique, the communication module implemented with Hypercall technique; in VMWARE adopting full virtualization technique, the communication module implemented with special hardware interrupts; and in the newest chipset of Intel and AMD, the communication module implemented with special instruments, such as VMCALL. Further description of the implementation of communication agent module 470 is omitted herein for simplicity. Control logic module 471 is used to determine the information about the relative locations of the VMs, and further to register and unregister each VM in global repository 480.

When receiving a request for connection establishment from the control unit of a VM through communication agent module 470, based on the IP address of a target VM contained in the received request, control logic module 471 searches global repository 480 for the virtualization layer ID (identifier), i.e., HVID, corresponding to the target VM, and determines whether both of the target VM and the requesting VM are on this physical host through the comparison of the target virtualization layer ID and its own virtualization layer ID. Then, control logic module 471 returns the result as a message to the control unit of the VM through communication agent module 470.

Control logic module 471 further receives information about VM live migration detected by the physical host system, indicating a VM migration out of this physical host, or a VM migration into this physical host from other physical host. When receiving the information indicating a VM migration out of this physical host, control logic module 471 notifies the information containing the IP address/ID of the migrated VM as a message to all of the other VMs not involved in the migration through communication agent module 470.

VM registration may happen when each VM starts up. When a VM starts up, control unit 403 of the VM sends a registration request containing its own ID and IP address to control logic module 471 of its virtualization layer, then control logic module 471 registers the ID (i.e., VMID) and IP address (i.e., VMIP) of that VM into global repository 480, as well as the ID of the virtualization layer (i.e., HVID) the VM "belongs" to.

Alternatively, the VM registration also can be carried out when a VM wants to establish a connection to other VM. Before the establishment of the connection, control unit 403 of the VM sends a registration request containing its own ID and IP address to control logic module 471 of its virtualization layer, and then control logic module 471 registers the ID (i.e., VMID) and IP address of that VM into global repository 480, as well as the virtualization layer's own ID (i.e., HVID) the VM "belongs" to. Besides the above cases, the VM registration may occur anytime, and obviously, a VM can be registered many times.

Each VM has a unique VMID all the time, and each virtualization layer has a unique HVID all the time. Since each physical host has only one virtualization layer, through checking the VMID and the corresponding HVID, control logic module 471 can determine whether two VMs are on the same virtualization layer, that is, on the same physical host. Global repository 480 stores the information about each VM in a triple (VMID, VMIP, HVID) or any other form serving the same or equivalent function.

When a migration occurs to a VM, based on the ID of that VM, control logic module 471 unregisters the VM from the global repository, that is, deletes all records containing the VMID. VM1 includes an interface unit 401-1 for invoking by other external applications, an offload engine unit 402-1, a control unit 403-1, a communication agent unit 405-1 and a data multiplexer 406-1.

VM2 includes an interface unit 401-2 for invoking by other external applications, an offload engine unit 402-2, a control unit 403-2, a communication agent unit 405-2 and a data multiplexer 406-2.

Next, taking VM1 as an example, a description is given of each module described above. It will be understood however, the corresponding components of other VMs have the same functions. For example, control unit 403-2 of VM2 has the same function as that of control unit 403-1 of VM1.

Communication agent unit 405-1 is used to transmit data between VM1 and a lower level, its virtualization layer. The communication agent unit has sophisticated implementations in the prior art, and thus its further discussion is omitted herein for simplicity.

Control unit 403-1 is used to receive a message about the relative locations of VMs, determine an appropriate connection establishment mechanism based on the received message, and then establish a connection according to the determined connection establishment mechanism. Through communication agent unit 405-1, a message is received from the virtualization layer by control unit 403-1, notifying control unit 403-1 of whether VM1 and the target VM to be connected are on the same physical host, another VM on the physical host migrating out of this physical host, or another VM migrating into this physical host.

If the received message indicates VM1 and the target VM to be connected are on the same physical host, based on the received message, control unit 403-1 determines an appropriate connection establishment mechanism, i.e., the TCP/IP protocol or the light weight protocol. If the received message indicates that another VM on the physical host is to be migrated out of this physical host, or another VM is to be migrated into this physical host, control unit 403-1 determines whether there is any established connection between VM1 and the VM to be migrated based on the information contained in the received message, such as the ID and IP address of the VM.

If there is an established connection, control unit 403-1 determines the appropriate connection establishment mechanism to be used after the VM migration, and then controls data multiplexer 406-1 to lock the TX queue and RX queue therein. After switching to the determined mechanism and establishing a connection according to that mechanism, control unit 403-1 controls data multiplexer 406-1 to unlock the TX queue and RX queue, and attach the unlocked queues to the established connection.

Control unit 403-1 includes a register table 404-1 for storing information about each connection, such as, the ID, IP address and port number of both VMs of a connection, the number of received packets, the number of transmitted packets. This information is merely illustrative, and their addition, deletion and/or modification are possible to those skilled in the art. Further, register table 404-1 can be implemented as database, file, or binary information stored on a VM, or any other data structure capable of storing the above information.

Control unit 403-1 queries the register table on the counterpart VMs IP address or ID contained in the received message. If the register table has the corresponding record(s), VM1 has at least one connection with the counterpart VM, and many records, many connections. Otherwise, if there is not such a record, it is indicated that there is not any connection between VM1 and the counterpart VM, in which case, VM1 discards the received message, and no further action is taken.

When VM1 starts up or attempts to establish a connection with other VM or in other situations where VM1 needs to be registered, control unit 403-1 sends the ID and the IP address of VM1 to control logic module 471 of its virtualization layer through communication agent unit 405-1 and communication agent module 470 in order to register VM1.

Data multiplexer 406-1 is used to attach data to the established connection under the control of control unit 403-1. Specifically, data multiplexer 406-1 includes a TX queue and a RX queue for each established connection, which are used to buffer data to be transmitted and data received, respectively. Under the control of control unit 403-1, data multiplexer 406-1 switches the application data received through interface unit 401-1 to the established connection based on light weight protocol or TCP/IP.

Further, data multiplexer 406-1 is used to lock and/or unlock the queues therein under the control of control unit 403-1. Specifically, when a VM migration is notified to control unit 403-1, control unit 403-1 controls data multiplexer 406-1 to lock the TX and RX queues first, and then, data multiplexer 406-1 unlocks the TX and RX queues when it is notified by control unit 403-1 the connection to be switched to has been successfully established, after which, data transmitting and receiving are continued. This switching process is transparent to applications. Because data is locked before the break of the current connection, and is unlocked after the establishment of the connection to be switched, no data will be lost, and it appears to the applications as if no connection broken occurs, that is, the connection is kept as uninterrupted. Because such a switch only takes several milliseconds, a slight drop in performance at most, or in most cases, no performance fluctuation will be felt by applications.

Offload engine unit 402-1 is used to provide TCP/IP stack information required to establish TCP/IP connection when the connection establishment mechanism is switched to TCP/IP protocol from light weight protocol. When the conventional TCP/IP protocol is used to establish connection, a three-way handshake process is adopted to negotiate various information of TCP control block between the two ends of the connection, such as the initial sequence number, sequential number, retransmitting list and out of order list, snd window size and rcv window size, timeout value of timer, and round trip time (RTT).

However, the present invention does not need such a handshake process, and a heuristic approach is used to set these values. For example, a Network Time Protocol (NTP)-based hash value can be used as the initial sequence number, and its estimating method is well known to those skilled in the art. The initial sequence number also can be a hash value obtained by the IP address of the migrated VM, or a default value predetermined by the physical host or the LAN, such as 10000, so long as the two parts of the TCP/IP connection can agree upon the initial sequence value. The sequential number is the sum of the initial sequence number and the number of the transmitted/received packets recorded in register table 404-1. The retransmitting list and out of order list are cleaned, that is, when a TCP/IP connection is set up, no retransmission is needed, and data packets are transmitted by in-order delivery. The snd window size and the rcv window size are set to a median value, for example, 8K, or other values the VMs can accept. The timeout threshold of each timer is set to the default value defined by TCP/IP protocol, and the RTT is set to a larger value, such as 500 ms.

Then, the TCP control block obtained is submitted to a TCP/IP stack implementing module (not shown) that has sophisticated implementations in the prior art to establish the TCP/IP connection. After the establishment of the connection, the TCP/IP stack implementing module attaches the interface unit to the established TCP/IP connection. Subsequently, each of the two parts transmits an ACK packet over the TCP/IP connection, and after receiving the corresponding ACK packet from the other, the connection is validated by the two parts and its successful establishment is notified to control unit 403. Although the performance of the TCP/IP connection is inclined to be not good enough at the beginning, the existing TCP/IP stack implementing module can adaptively adjust its sets during the communication, such as increasing the snd or rcv window size or shortening the RTT value.

Referring to FIG. 4, the initial connecting process between two VMs is illustrated. When VM2 attempts to set up a connection to VM1, control unit 403-2 of VM2 assigns a port number to this connection, PortID2, and put down a record for this connection in register table 404, updating the record with PortID2 and the IP addresses of VM1 and VM2, and setting the other values of the record to default values, such as NULL or others.

Control unit 403-2 then sends the IP addresses and the port numbers of VM1 and VM2 to control logic module 471 of the virtualization layer through communication agent unit 405-2.

After receiving the IP addresses of VM1 and VM2 from VM2 through communication agent module 470, control logic module 471 retrieves the VMID1 and HVID1 of VM1 from global repository 480 based on the IP address of VM1.

If control logic module 471 cannot retrieve the HVID 1 of VM1 from global repository 480, it is determined by default that VM1 and VM2 are not on the same physical host. Otherwise, if control logic module 471 can acquire the VMID1 and HVID1 of VM1 from global repository 480, the acquired HVID1 of VM1 is compared with its own HVID to check whether the two are identical. If they are different, it is determined that VM1 and VM2 are on different physical hosts.

Next, through communication agent module 470 and communication agent unit 405-2, control logic module 471 notifies the control unit 403-2 of the IP addresses and port numbers of VM1 and VM2 as well as the fact that VM1 and VM2 are on different physical hosts. The notification can be carried out in any form based on the mechanisms supplied by the virtualization layer.

After receiving the notification, control unit 403-2 selects the TCP/IP protocol as the connection establishment mechanism to be used based on the information contained in the notification indicating that VM1 and VM2 are not on the same physical host. Control unit 403-2 sends the IP addresses and port numbers of VM1 and VM2 to the TCP/IP stack implementing module to establish TCP/IP connection between VM1 and VM2. After receiving the validation of successful connection establishment from the TCP/IP stack implementing module, control unit 403-2 controls data multiplexer 406-2 to attach the data in TX queue and RX queue to the established TCP/IP connection. If a notification of failed connection establishment is received from the TCP/IP stack implementing module, control unit 403-2 removes the record for this connection from register table 404-2 based on the IP addresses and port numbers of VM1 and VM2, and reports the failure to corresponding applications.

If control logic module 471 has retrieved the VMID1 and HVID1 of VM1 from global repository 480, it compares the HVID1 of VM1 and its own HVID. If they are identical, control logic module 471 determines VM1 and VM2 are on the same physical host, and notifies control unit 403-2 of the IP addresses and port numbers of VM1, VM2 as well as the fact that VM1 and VM2 are on the same physical host. The notification can be carried out in any form based on the mechanisms supplied by the virtualization layer.

After having received the notification, control unit 403-2 selects light weight protocol as the connection establishment mechanism to be used based on the information contained in the notification indicating that VM1 and VM2 are on the same physical host, and then updates the ID default value of VM1 within the corresponding record to the ID value contained in the received message based on the received IP addresses and port numbers of VM1 and VM2, and the ID of VM1.

Then, control unit 403-2 sends the VMID1 and VMID2 of the VM1 and VM2 to a light weight protocol engine module (not shown) that has sophisticated implementations in the prior art for light weight connection establishment. The light weight protocol engine module establishes a light weight connection between VM1 and VM2, and then notifies the successful connection establishment to control unit 403-2. After receiving the validation of successful connection establishment from the light weight protocol engine module, control unit 403-2 controls data multiplexer 406-2 to attach the data in the TX queue and RX queue to the established light weight connection. If a notification of failed connection establishment is received from the protocol engine module, control unit 403-2 removes the record for this connection from register table 404-2 based on the IP addresses and port numbers of VM1 and VM2, and reports the failure to corresponding applications.

Figure 5:
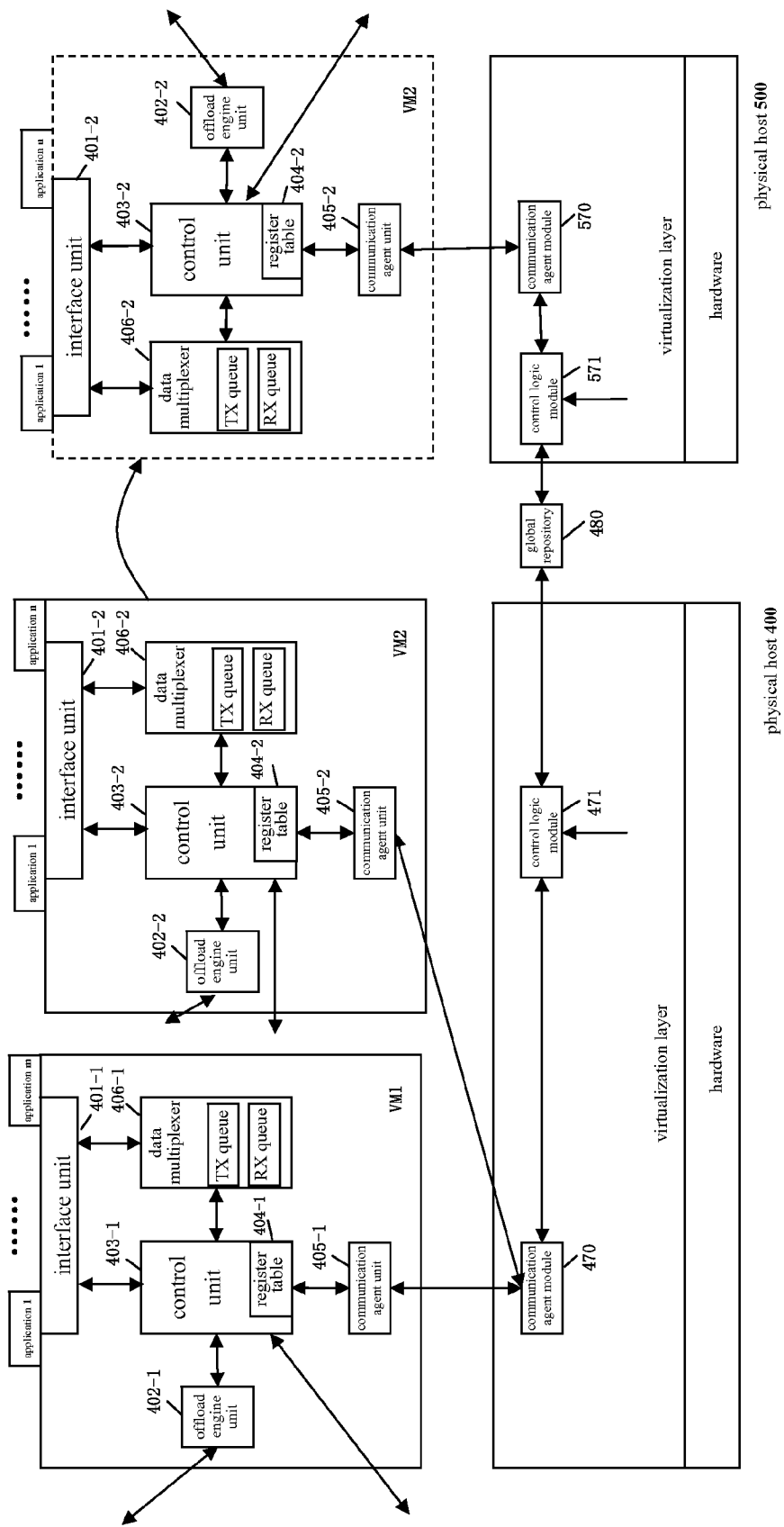
FIG. 5 illustrates a system in a situation in which the connection establishment mechanism is switched to TCP/IP protocol when a VM migration occurs after the light weight connection has been established between the VMs as described above.
Figure 6:
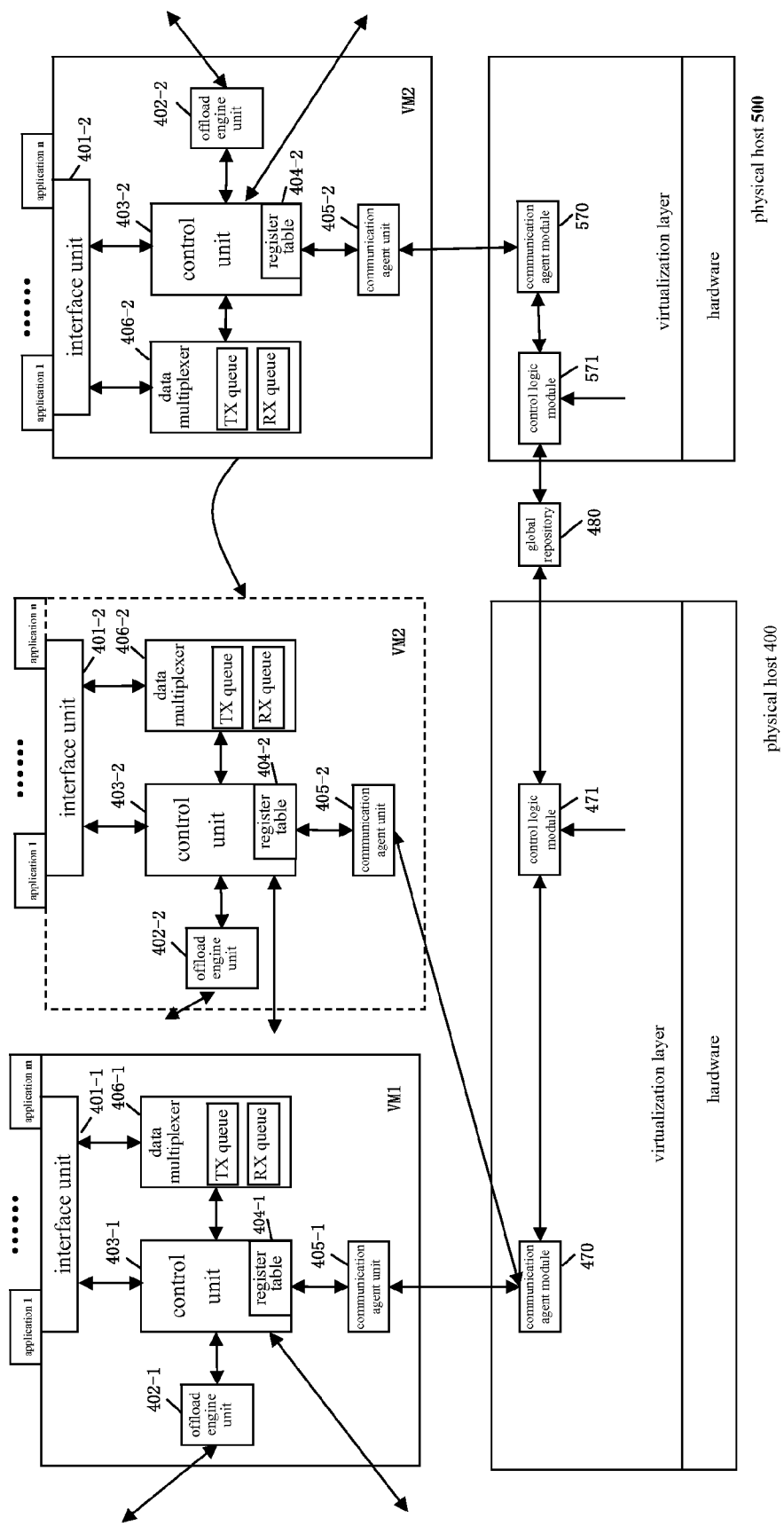
FIG. 6 illustrates a system in a situation in which the connection establishment mechanism is switched to light weight protocol when a VM migration occurs after a TCP/IP connection has been established between the VMs as described above.

Referring to FIGS. 5 and 6, a process is described for switching the connection establishment mechanism when a VM migration occurs after the establishment of light weight connection between VMs.

Referring to FIG. 5 first, it is assumed that VM2 and VM1 are on the same physical host, for example, physical host 400, and VM2 will be migrated to another physical host, for example physical host 500, after a light weight connection has been established between VM2 and VM1. Before the actual migration of VM2, control unit 403-2 of VM2 first instructs data multiplexer 406-2 to lock its TX queue and RX queue. Then the migration of VM2 begins.

Once the virtualization layer of physical host 400 receives a message indicating the migration of VM2, it notifies and controls control logic module 471 to retrieve the IP address of VM2 from global repository 480 based on the VMID2 of VM2, and deletes all records of VM2 from global repository 480 based on the VMID2 of VM2.

After the successful migration of VM2, the virtualization layer of physical host 500 assigns a new VMID to VM2, and its control logic module 571 registers VM2 again in global register 480, i.e., stores the ID assigned to VM2 by physical host 500, the IP address of VM2 and the ID of the virtualization layer of physical host 500 as (VMID, VMIP, HVID) in global register 480.

Control logic module 471 of the virtualization layer of physical host 400 supplies a message containing the IP address of VM2 and the information indicating that VM2 is on a different physical host to communication agent module 470. The information can be in any form capable of serving such function. Based on the existing mechanisms of its own virtualization layer, which are well known to those skilled in the art, communication agent module 470 supplies the above message to the control units of the other VMs besides VM2 on physical host 1.

Next, taking VM1 as an example, the actions carried out by other VMs on physical host 400 after receiving the above message is described. After receiving that notification message, control unit 403-1 of VM1 selects the TCP/IP protocol as the connection establishment mechanism to be used between VM1 and the VM having this IP address based on the information contained in that notification message indicating VM2 is on a different physical host. Control unit 403-1 of VM1 queries the register table 404-1 based on the IP address of VM2 to check whether there is any record associated with this IP address. If no record can be found, it indicates that VM1 does not have any light weight protocol connection to VM2, and then the message is discarded and no other actions are taken. If there is any corresponding record, it indicates that at least one light weight protocol connection has been established between VM1 and VM2, and many records, many connections established. Control unit 403-1 controls data multiplexer 406-1 to lock the TX and RX queues associated with these connections, and update each item of the records, such as the number of the packets received and the number of the packets transmitted, according to the current state of the queues.

After the queues are locked, control units 403-1 and 403-2 of VM1 and VM2 control offload engine unit 402-1 and 402-2, respectively, to construct the TCP control block with a heuristic approach based on the associated information of register tables 404-1 and 404-2, such as the IP addresses and port numbers of the both sides, the number of the packets received, the number of the packets transmitted, and then send the TCP control block constructed as such to the TCP/IP stack implementing module (not shown). The TCP/IP stack implementing module establishes the TCP/IP connection based on the received TCP control block, and then returns a message indicating the successful establishment of the connection to control units 403-1 and 403-2.

After receiving the message, control units 403-1 and 403-2 of VM1 and VM2 control data multiplexers 406-1 and 406-2 respectively to unlock the TX and RX queues. In response to the control of control units 403-1 and 403-2, data multiplexers 406-1 and 406-2 unlock the TX and RX queues, and start data transmission over the TCP/IP connection.

Referring to FIG. 6, it is assumed that VM2 will be migrated to physical host 400 on which VM1 locates after the establishment of a connection between VM1 on physical host 400 and VM2 on physical host 500. Before the actual migration of VM2, control unit 403-2 of VM2 at first instructs data multiplexer 406-2 to lock the TX and RX queues thereof, and then the migration of VM2 begins.

Once the virtualization layer of physical host 500 receives a message indicating the migration of VM2, it notifies and controls control logic module 571 to retrieve the IP address of VM2 from global repository 480 based on the VMID2 of VM2, and deletes all records of VM2 from global repository 480 based on the VMID2 of VM2.

Then, the migration of VM2 starts. After the successful migration of VM2 from physical host 500 to physical host 400, physical host 400 assigns VMID2' to VM2, and then control unit 403-2 of VM2 initiates the registration process as described above. Control logic module 471 of the virtualization layer of physical host 400 registers VM2 in global repository 480 again, that is, stores the ID assigned to VM2 by physical host 400, the IP address of VM2 and the ID of the virtualization layer of physical host 400 as (VMID, VMIP, HVID) in global register 480.

After assigning VMID2' to VM2, control logic module 471 of the virtualization layer of physical host 400 supplies a message containing the IP address of VM2, VMID' and the information that VM2 is on the same physical host to communication agent module 470. The information can be in any form capable of serving such function. Based on the existing mechanisms of its own virtualization layer, which are well known to those skilled in the art, communication agent module 470 supplies the above message to the control units of the other VMs besides VM2.

Next, taking VM1 as an example, the actions carried out by other VMs after receiving the above message is described.

After receiving that notification message, control unit 403-1 of VM1 selects the light weight protocol as the connection establishment mechanism to be used between VM1 and the VM with this IP address based on the information contained in the notification message that VM2 is on the same physical host. Control unit 403-1 of VM1 queries the register table 404-1 based on the IP address of VM2 to check whether there is any record associated with this IP address. If no such record can be found, it indicates that VM1 does not have any TCP/IP protocol connection with VM2, and then the message is discarded and no other actions are taken. If there is any corresponding record, it indicates that at least one TCP/IP protocol connection has been established between VM1 and VM2, and many records, many connections established, and in such case, the ID of VM2 of each record is updated to VMID2'. Control unit 403-1 controls data multiplexer 406-1 to lock the TX and RX queues associated with these connections, and update each item of the records, such as the number of the packets received and the number of the packets transmitted, according to the current state of the queues.

Then, control unit 403-1 of VM1 sends the ID of VM2 to the light weight protocol engine module (not shown) to establish light weight protocol connection between VM1 and VM2. After the successful establishment of the light weight connection, the light weight protocol engine module returns a successful message to control unit 403.

After receiving the successful message, control units 403-1 and 403-2 of VM1 and VM2 control their data multiplexers 406 respectively to unlock the TX and RX queues. In response to the control of control unit 403, data multiplexers 406 unlock the TX and RX queues, and start data transmission over the light weight connection.

FIG. 7 shows a specific form of message exchanged between the VM and the virtualization layer according to the present invention. However, the present invention is not limited to this, and any message serving the same or equivalent function can be adopted. Preferably, a field without a value in the message is set to NULL. For example, a registration request message is (01, VMID1, VMIP1, NULL, NULL, NULL, NULL); a request message for a connection establishment is (01, NULL, VMIP1, PortID1, NULL, VMIP2, PortID2); the message returned to a VM in response to the connection establishment request is: (10, VMID1, VMIP1, PortID1, NULL, VMIP2, PortID2) or (11, NULL, VMIP1, PortID1, NULL, VMIP2, PortID2); the message returned to a VM in response to a dynamical migration is: (10, NULL, NULL, NULL, VMID2, VMIP2, NULL) or (11, NULL, NULL, NULL, NULL, VMIP2, NULL). As shown in FIG. 7 certainly, the message also can include other information, and can adopt other message types.

Figure 8:
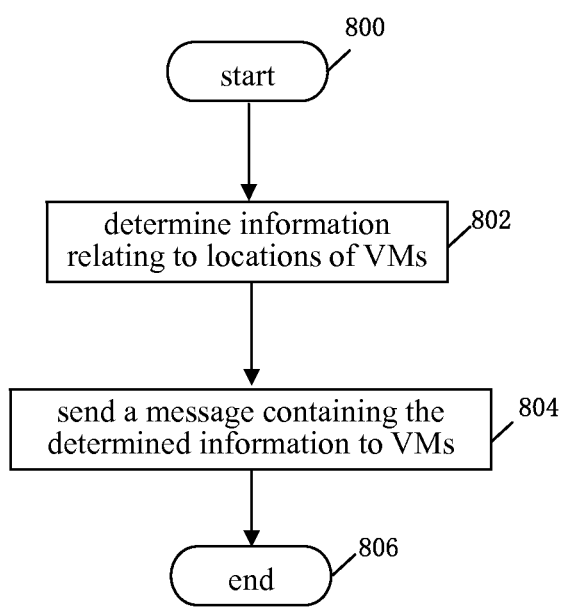
FIG. 8 is a flowchart of the method for determining the locations of the VMs in the virtualization layer.

FIG. 8 shows the flowchart of the method for determining the locations of VMs in the virtualization layer according to the present invention.

The method according to the present invention starts at step 800.

At step 802, information about the locations of the VMs is determined.

At step 804, a message containing the determined information is sent to the VM.

At step 806, the process ends.

Figure 9:
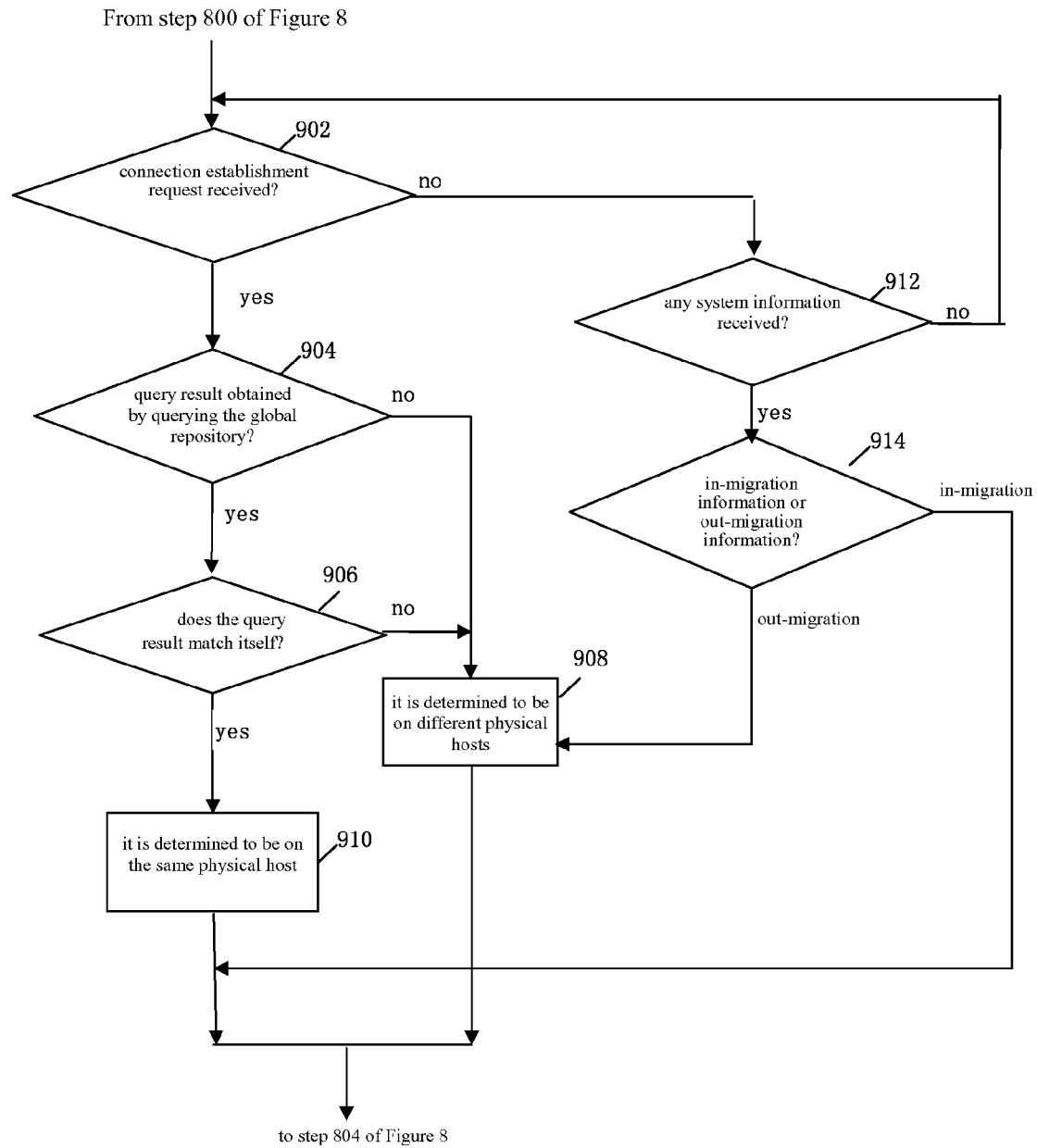
FIG. 9 is a flowchart showing the detail process of the step 802 of FIG. 8.

FIG. 9 is a flowchart showing the detail contents of step 802 of FIG. 8.

At step 902, a decision is made as to whether a request for a connection establishment is received. If no such request is received, the process proceeds to step 912, otherwise it proceeds to step 904.

At step 904, the global repository is queried based on the information contained in the request for connection establishment, such as IP address. If no query result, for example, the ID of the virtualization layer of the counterpart VM, can be acquired, the process proceeds to step 908, otherwise, it proceeds to step 906.

At step 906, a decision is made as to whether the query result matches the own information of the virtualization layer. If so, the process proceeds to step 910, otherwise it proceeds to step 908.

At step 908, a decision is made that the VM is on a different physical host, then the process proceeds to step 804 of FIG. 8.

At step 910, a decision is made that the VM is on the same physical host, then the process proceeds to step 804 of FIG. 8.

At step 912, a decision is made as to whether system information is received. If no such information is received, the process returns to step 902, otherwise the process proceeds to step 914.

At step 914, a decision is made as to whether the received system information indicates a VM migration out of this physical host or a VM migration into this physical host. If it indicates a VM migration into this physical host, the process proceeds to step 910, otherwise the process proceeds to step 908.

The details of the above steps have been described in the description of each components of the virtualization layer, and are not repeated herein.

Figure 10:
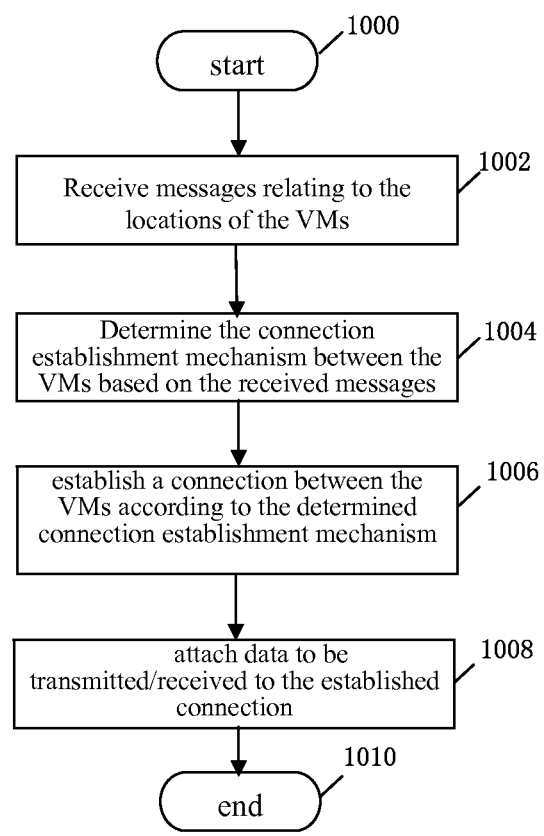
FIG. 10 is a flowchart of the method of the present invention for dynamically determining the connection establishment mechanism between VMs according to the locations thereof.

FIG. 10 is a flowchart showing the method for dynamically determining the connection establishment mechanism between VMs based on the locations of the VMs according to the present invention.

The method of the present invention starts at step 1000.

At step 1002, a message relating to the locations of VMs is received. Then the process proceeds to step 1004.

At step 1004, based on the received message, the connection establishment mechanism between the VMs is determined. If the message received from the virtualization layer indicates that the VMs are on different physical hosts, TCP/IP protocol is selected as the connection establishment mechanism; otherwise if the message received from the virtualization layer indicates that the VMs are on the same physical host, light weight protocol is selected as the connection establishment mechanism. Then the process proceeds to step 1006.

At step 1006, a control is made to establish the connection between the VMs according to the determined connection establishment mechanism. If the selected mechanism is different from the current mechanism due to a VM migration in the case of there is any connection established between the VMs, the data transmitting and receiving need to be locked before the switch of the connection establishment mechanism. After the successful establishment of the connection, it is required to unlock the data transmitting and receiving.

At step 1008, the data to be transmitted/received is attached to the established connection under a control.

The details of the above steps have been described in the description of each components of the virtualization layer, and are not repeated herein.

With the present invention, the mechanism for establishing connection between VMs can be determined dynamically according to the locations of the VMs. A light weight protocol is used when two VMs are on the same physical host, and the common TCP/IP protocol stack is used when a live migration occurs so that the two VMs are no longer located on the same physical host. As a result, the problem of unnecessary system overhead and interrupted connection after migration can be solved and the best system performance can be maintained.

The TCP/IP protocol and the light weight protocol used in the present invention have sophisticated implementations in the prior art, and thus have greatest compatibility with the existing applications, and consequently, save cost for users.

Through dynamically determining the connection establishment mechanism based on the locations of VMs, the present invention can fully take the advantages of the light weight protocol and the TCP/IP protocol and avoid the shortcomings thereof, and hence, the best system performance can be maintained constantly.

Various modifications to the present invention will be clear to those skilled in the art. Those modifications and varieties are intended to be covered by the present invention so long as they are within the scope defined by the appended claims and the equivalent thereof.

What is claimed is:

1. An apparatus for dynamically establishing a connection between a plurality of virtual machines (VMs) based on locations of the VMs, the apparatus comprising at least one processor and at least one memory that together implement:
    (a) a communication agent unit configured to receive messages relating to the locations of the VMs;
    (b) a control unit configured to: (i) determine a connection establishment mechanism between the VMs based on the received messages, and (ii) control the establishment of a connection between the VMs based upon the determined connection establishment mechanism, whereby the connection is dynamically established;
    (c) a determination engine unit configured to determine connection information to be transmitted by one of the connection establishment mechanisms; and
    a repository configured to store, for use in connection with dynamically establishing the connection, information about each of the VMs in the form of a triple (VMID, VMIP, HVID), wherein VMID corresponds to a unique ID for each VM, wherein VMIP corresponds to an IP address of each VM and wherein HVID corresponds to a unique ID for each associated virtualization layer;
    wherein said control unit is further configured to determine:
    a light weight protocol to be used as the connection establishment mechanism when the messages relating to the locations of the VMs comprise information indicating that the VMs are on the same physical host, wherein the light weight protocol excludes checksum, in order delivery and congestion control; and
    a TCP/IP protocol to be used as the connection establishment mechanism when the messages relating to the locations of the VMs comprise information indicating that the VMs are on different physical hosts.

2. The apparatus according to claim 1, wherein the at least one processor and the at least one memory together further implement:
    a data multiplexer configured to attach the data to be transmitted/received to the established connection under the control of said control unit.

3. The apparatus according to claim 1, wherein said control unit further comprises:
    a register table for recording information on each connection, wherein said information includes: (i) the numbers of packets which have been transmitted and received; and (ii) at least one of identifiers (IDs), IP addresses, and port numbers of the VMs on the two ends of the connection.

4. The apparatus according to claim 3, wherein said messages relating to the locations of the VMs comprise information indicating whether the VMs are on a same physical host or on different physical hosts.

5. The apparatus according to claim 1, wherein the information to be transmitted by the one of the connection establishment mechanisms comprises an initial sequence number and a sequential number;
    wherein said initial sequence number is one of a hash value based on a network time protocol value, the IP address of a migrated VM and a default value; and
    wherein said sequential number is the sum of the hash value and a number of packets transmitted/received.

6. The apparatus according to claim 5, wherein the determination engine unit is configured to determine the hash value based on the network time protocol value.

7. The apparatus according to claim 5, wherein the determination engine unit is configured to determine the hash value based on the IP address of the migrated VM.

8. The apparatus according to claim 1, wherein said control unit is further configured to execute a switch of the connection establishment mechanism when said control unit determines that a different connection establishment mechanism should be adopted based on at least one of the received messages.

9. The apparatus according to claim 8, wherein said control unit is further configured to execute the switch by:
    causing said data multiplexer to lock the data to be transmitted/received;
    establishing a connection according to the determined different connection establishment mechanism;
    causing said data multiplexer to unlock the data; and
    attaching the data to be transmitted/received to the established connection.

10. A method for dynamically establishing a connection between a plurality of virtual machines (VMs) based on locations of the VMs, the method comprising:
    receiving messages relating to the locations of the VMs;
    determining a connection establishment mechanism between the VMs based on the received messages;
    establishing a connection between the VMs according to said determined connection establishment mechanism, whereby the connection is dynamically established;
    determining connection information to be transmitted by one of the connection establishment mechanisms; and
    storing, for use in connection with dynamically establishing the connection, information about each of the VMs in the form of a triple (VMID, VMIP, HVID), wherein VMID corresponds to a unique ID for each VM, wherein VMIP corresponds to an IP address of each VM and wherein HVID corresponds to a unique ID for each associated virtualization layer;
    wherein the determining the connection establishment mechanism further determines:
    a light weight protocol to be used as the connection establishment mechanism when the messages relating to the locations of the VMs comprise information indicating that the VMs are on the same physical host, wherein the light weight protocol excludes checksum, in order delivery and congestion control; and
    a TCP/IP protocol to be used as the connection establishment mechanism when the messages relating to the locations of the VMs comprise information indicating that the VMs are on different physical hosts.

11. The method according to claim 10, further comprising the step of:

attaching the data to be transmitted/received to the established connection.

12. The method according to claim 11, wherein the messages relating to the locations of the VMs comprise information indicating whether the VMs are on a same physical host or on different physical hosts.

13. The method according to claim 10, further comprising the step of:
executing a switch of the connection establishment mechanism when it is determined that a different connection establishment mechanism should be adopted based on at least one of the received messages.

14. The method according to claim 13, wherein said executing step comprises:
locking the data to be transmitted/received;
establishing a connection according to said different connection establishment mechanism;
unlocking the data; and
attaching the data to be transmitted/received to the established connection.

15. The method according to claim 13, further comprising the step of:
constructing a TCP/IP control block for the TCP/IP connection when the light weight protocol is switched to the TCP/IP protocol.

16. The method according to claim 10, wherein the determining the connection information to be transmitted comprises determining a hash value based on a network time protocol value.

17. The method according to claim 10, wherein the determining the connection information to be transmitted comprises determining a hash value based on an IP address of a migrated VM.

* * * * *